US012548264B2

United States Patent
Perumalla et al.

(10) Patent No.: US 12,548,264 B2
(45) Date of Patent: Feb. 10, 2026

(54) CHAIN OF VIRTUAL REALITY (VR) CONTENT SHARING WITH ACTIVITY INFORMATION

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Sugata Mazumdar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 624 days.

(21) Appl. No.: 17/935,348

(22) Filed: Sep. 26, 2022

(65) Prior Publication Data
US 2024/0104856 A1  Mar. 28, 2024

(51) Int. Cl.
*G06T 19/00* (2011.01)
*G06T 13/40* (2011.01)
*G06T 19/20* (2011.01)

(52) U.S. Cl.
CPC ............ *G06T 19/006* (2013.01); *G06T 13/40* (2013.01); *G06T 19/20* (2013.01)

(58) Field of Classification Search
None
See application file for complete search history.

(56) References Cited

U.S. PATENT DOCUMENTS

| 8,914,472 | B1 * | 12/2014 | Lee ...................... G06Q 30/04 709/219 |
| 10,115,233 | B2 | 10/2018 | Miller et al. |

(Continued)

FOREIGN PATENT DOCUMENTS

WO    2010145228 A1    12/2010

OTHER PUBLICATIONS

T. Piumsomboon, et al, "NPL-CoVAR Mixed-Platform Remote Collaborative Augmented and Virtual Realities System with Shared Collaboration Cues", 2017 IEEE International Symposium on Mixed and Augmented Reality Adjunct Proceedings, Oct. 13, 2017, [online] [Retrieved Sep. 7, 2022,] pp. 218-219, https://ieeexplore.ieee.org/abstract/document/8088489.

(Continued)

*Primary Examiner* — Aneeta Yodichkas
(74) *Attorney, Agent, or Firm* — Konrad, Raynes, Davda & Victor, LLP; Janaki K. Davda

(57) ABSTRACT

Provided are techniques for chain of virtual reality content sharing with activity information. A first Virtual Reality (VR) content is received from a first node in a chain of nodes, wherein the first VR content includes a first avatar and interaction of the first avatar with the first VR content. It is determined whether a second user is interacting with the first VR content at a second node in the chain of nodes. In response to determining that the second user is interacting with the first VR content, a second VR content is created with an incremental update to the first VR content by: creating a second avatar and adding the second avatar and interaction of the second avatar with the first VR content to the first VR content. The second VR content is sent to a third node in the chain of nodes.

20 Claims, 11 Drawing Sheets

(56) References Cited

U.S. PATENT DOCUMENTS

| | | | |
|---|---|---|---|
| 10,388,072 | B2 | 8/2019 | Egeler et al. |
| 2016/0093108 | A1 | 3/2016 | Mao et al. |
| 2018/0324229 | A1 | 11/2018 | Ross et al. |
| 2020/0260149 | A1 | 8/2020 | Ding et al. |
| 2020/0336707 | A1 | 10/2020 | Schmirler et al. |
| 2020/0394012 | A1 | 12/2020 | Wright, Jr. et al. |
| 2022/0043263 | A1* | 2/2022 | Wieczorek ........... G02B 27/017 |
| 2023/0068660 | A1* | 3/2023 | Brent ...................... G06F 9/453 |

OTHER PUBLICATIONS

E. Hanapole, "The Metaverse of Intellectual Property—Journey to AI Blog", Apr. 25, 2022, 5 pp., [Online] [ Retrieved Sep. 7, 2022] https://www.ibm.com/blogs/journey-to-ai/2022/04/the-metaverse-of-intellectual-property/.

V. Bertocci, "Authenticating Users in Your VR Apps", Mar. 16, 2022, pp. 1-16, [Online][Retrieved Sep. 7, 2022] https://auth0.com/blog/authenticating-users-in-your-vr-apps/.

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

* cited by examiner

CHAIN OF VIRTUAL REALITY (VR) CONTENT SHARING WITH ACTIVITY INFORMATION

BACKGROUND

Embodiments of the invention relate to a chain of virtual reality content sharing with activity information.

Virtual Reality (VR) may be described as a computer-generated environment with scenes and objects that appear to be real, making users feel as if they are immersed in their surroundings. This computer-generated environment is perceived through a device known as a VR headset or helmet. VR allows users to immerse themselves in video games as if the users are the characters, learn how to perform heart surgery, improve the quality of sports training to maximize performance, etc. In addition, while using a VR headset or helmet, users may also perform activities from a remote location, such as controlling machines, shopping, education etc.

SUMMARY

In accordance with certain embodiments, a computer-implemented method comprising operations is provided for chain of virtual reality content sharing with activity information. In such embodiments, a first Virtual Reality (VR) content is received from a first node in a chain of nodes, wherein the first VR content includes a first avatar and interaction of the first avatar with the first VR content. It is determined whether a second user is interacting with the first VR content at a second node in the chain of nodes. In response to determining that the second user is interacting with the first VR content, a second VR content is created with an incremental update to the first VR content by: creating a second avatar and adding the second avatar and interaction of the second avatar with the first VR content to the first VR content. The second VR content is sent to a third node in the chain of nodes.

In accordance with other embodiments, a computer program product is provided for chain of virtual reality content sharing with activity information. The computer program product comprises a computer readable storage medium having program code embodied therewith, the program code executable by at least one processor to perform operations. In such embodiments, a first Virtual Reality (VR) content is received from a first node in a chain of nodes, wherein the first VR content includes a first avatar and interaction of the first avatar with the first VR content. It is determined whether a second user is interacting with the first VR content at a second node in the chain of nodes. In response to determining that the second user is interacting with the first VR content, a second VR content is created with an incremental update to the first VR content by: creating a second avatar and adding the second avatar and interaction of the second avatar with the first VR content to the first VR content. The second VR content is sent to a third node in the chain of nodes.

In accordance with yet other embodiments, a computer system is provided for chain of virtual reality content sharing with activity information. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. In such embodiments, a first Virtual Reality (VR) content is received from a first node in a chain of nodes, wherein the first VR content includes a first avatar and interaction of the first avatar with the first VR content. It is determined whether a second user is interacting with the first VR content at a second node in the chain of nodes. In response to determining that the second user is interacting with the first VR content, a second VR content is created with an incremental update to the first VR content by: creating a second avatar and adding the second avatar and interaction of the second avatar with the first VR content to the first VR content. The second VR content is sent to a third node in the chain of nodes.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While a first user wearing a first VR headset is interacting with VR content (e.g., remotely operating a machine), embodiments enable the first user to share the same VR content with a second user wearing a second VR headset (e.g., so that the second user may visualize and learn how the first user is remotely operating the machine). At the same time, while the second user is watching the VR content shared by the first user, embodiments enable the second user to share the same VR content with a third user wearing a third VR headset. That is, embodiments enable multiple users to share VR content.

Figure 1:
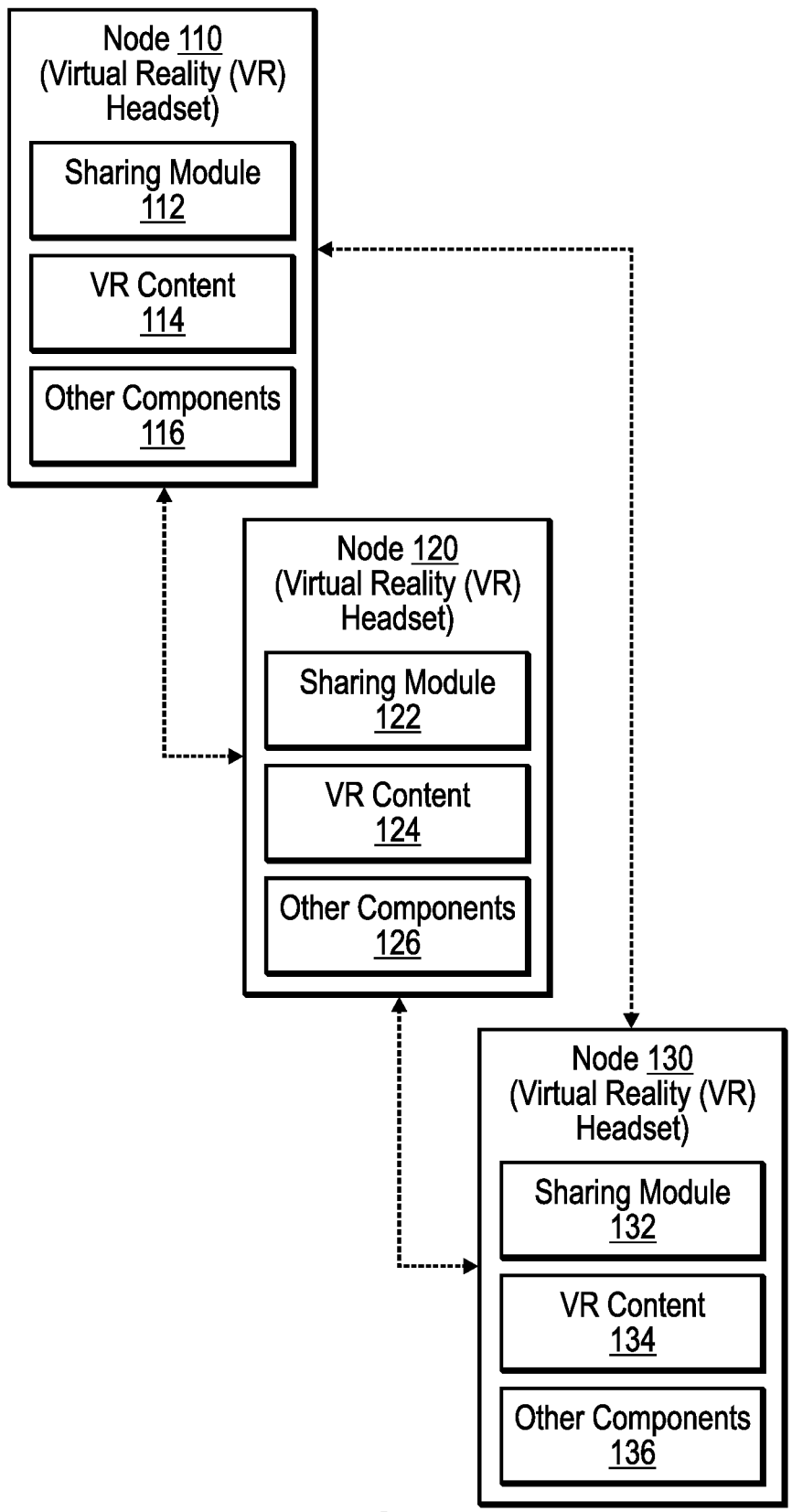
FIG. 1 illustrates, in a block diagram, a computing environment in accordance with certain embodiments.

FIG. 1 illustrates, in a block diagram, a computing environment in accordance with certain embodiments. Node 110 includes a sharing module 112 and VR content 114. Node 120 includes a sharing module 122 and VR content 124. Node 130 includes a sharing module 132 and VR content 134. Each of the nodes 110, 120, 130 may also include other components 116, 126, 136. In certain embodiments, the other components 116, 126, 136 are any combination of: an accelerometer, a gyroscope, a magnetometer, and a proximity sensor to detect the user's motion.

With embodiments, nodes 110, 120, and 130 are each VR headsets and may connect to each other. A VR headset (or "VR goggles") may be described as a head-worn apparatus that covers the eyes to create an immersive multi-dimensional (e.g., 3-dimensional (3D)) environment. The VR headset projects VR content 114, 124, 134 (e.g., the animation) on the retina of the user's eye to enable the user to view the VR content 114, 124, 134. In addition, the VR headset may include computer elements (e.g., an operating system that executes applications in memory) and/or may work with a computer to create the multi-dimensional environment with animation. In some cases, the VR headset is connected to a smartphone.

With embodiments, any node 110, 120, 130 may ask any other node 110, 120, 130 to share VR content 114, 124, 134. While a first node 110, 120, and 130 is viewing VR content 114, 124, 134, the sharing module 112, 122, 132 of a second node 110, 120, 130 may ask to share VR content 114, 124, 134. The sharing module 112, 122, 132 of the first node 110, 120, 130 may allow sharing or may deny sharing. If the sharing module 112, 122, 132 of the first node 110, 120, 130 allows sharing by the second node 110, 120, 130, then the sharing module 112, 122, 132 of the first node 110, 120, 130 sends VR content 114, 124, 134 to the sharing module 112, 122, 132 of the second node.

With embodiments, sharing begins at the time the first node 110, 120, 130 allows the sharing. For example, if the first node 110, 120, 130 has been viewing VR content 114, 124, 134 from Time T1 to Time T2, the second node requests to share the VR content at Time T2, and the first node 110, 120, 130 allows the second node 110, 120, 130 to share the VR content 114, 124, 134, the second node 110, 120, 130 starts viewing the VR content 114, 124, 134 that is available from time T2 on (i.e., from the time the request to share is allowed).

With embodiments, sharing may be said to be in a "chain". That is, once the second node 110, 120, 130 is sharing VR content 114, 124, 134 of the first node 110, 120, 130 starting at time T2, then, a third node 110, 120, 130 may ask the second node 110, 120, 130 to share VR content 114, 124, 134. The sharing module 112, 122, 132 of the second node 110, 120, 130 may allow sharing or may deny sharing. If the sharing module 112, 122, 132 of the second node 110, 120, 130 allows sharing by the third node 110, 120, 130, then the sharing module 112, 122, 132 of the second node 110, 120, 130 sends VR content 114, 124, 134 to the sharing module 112, 122, 132 of the third node. If the third node joins at time T3, then, the third node starts viewing the VR content 114, 124, 134 that is available from time T3 on.

With embodiments, if a node 110, 120, 130 asks to share VR content 114, 124, 134 and receives a message denying the request, the node 110, 120, 130 may ask to share with another node 110, 120, 130 by sending a request to that other node 110, 120, 130.

Although three nodes are shown in FIG. 1, any number of nodes may communicate with each other to share VR content 114, 124, 134.

With embodiments, a node in the chain that is providing shared VR content is an "ancestor" or "sending" node, while the node in the chain that is receiving the shared VR content is a "descendent" or "receiving" node. A node that has one or more descendants and no ancestors may be referred to as a "root" node. A note that has one or more ancestors and no descendants may be referred to as a "leaf" node. Any node in the chain may have one or more ancestors (e.g., a first ancestor, a second ancestor, etc.) and/or one or more descendants (e.g., a first descendant, a second descendant, etc.). Any node in the chain may be a receiving and/or sending node.

In certain embodiments, the sharing module 112, 122, 132 at a node 110, 120, 130 may ask to share VR content with multiple nodes, and the sharing module 112, 122, 132 may aggregate the VR content to send to another node.

With embodiments, the sharing module 112, 122, 132 at one node may send the VR content to multiple nodes.

Figure 2:
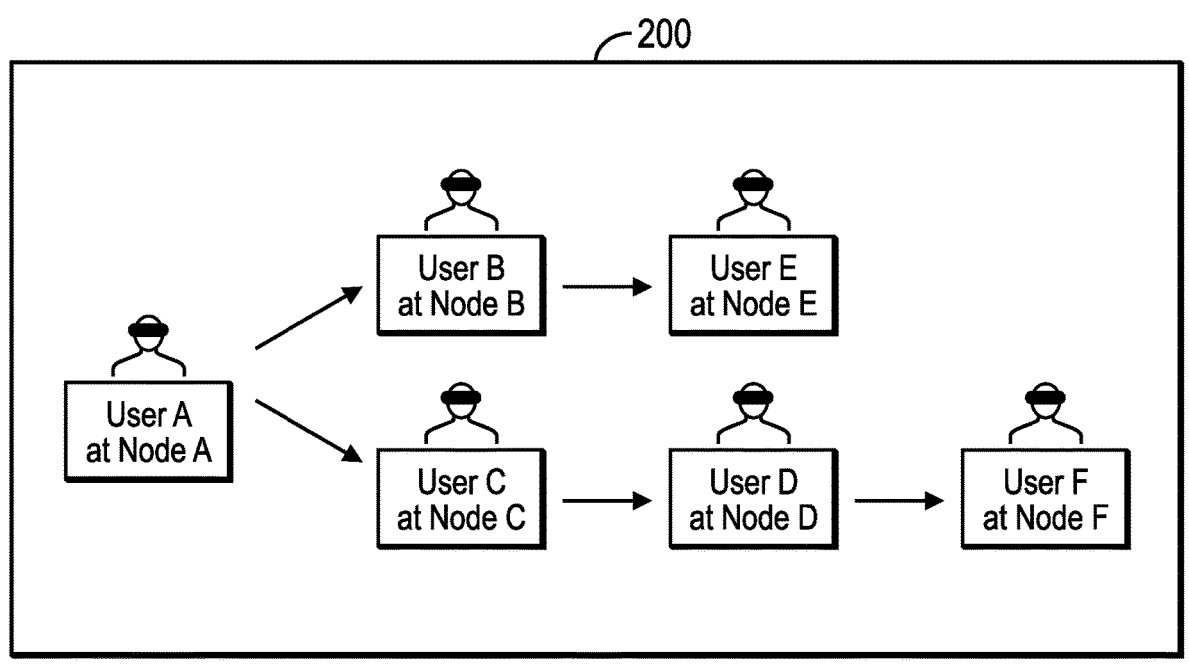
FIG. 2 illustrates a chain of nodes in accordance with certain embodiments.

FIG. 2 illustrates a chain of nodes 200 in accordance with certain embodiments. In particular, FIG. 2 illustrates propagation of shared VR content by sharing modules at the nodes 200. With embodiments, the shared VR content is propagated from each sharing module of a sharing node in the chain to a sharing module of another sharing node in the chain. In FIG. 2, User A at Node A is performing an activity in a VR environment and is sharing this VR content with User B at Node B and User C at Node C. User B at Node B shares the VR content with User E at Node E. User C at Node C shares the VR content with User D at Node D, and User D at Node D shares the VR content with User F at Node F.

For example, User A at Node A may be performing remote machine maintenance in the VR environment. User B at Node B is watching the VR content shared by User A at Node A and not performing any activity in the VR environment (e.g., not also performing remote machine maintenance). User E at node E is viewing the same VR content as User A at Node A has shared with User B at Node B, since User B at Node B is not performing any activity in the VR environment. That is, the sharing module of User A at Node A sends VR content to the sharing module of User B at Node B, and the sharing module of User B at Node B sends (or passes) that VR content to the sharing module of User E at Node E. In this example, User A at Node A, User B at Node B, and User E at Node E watch the same VR content.

Figure 3:
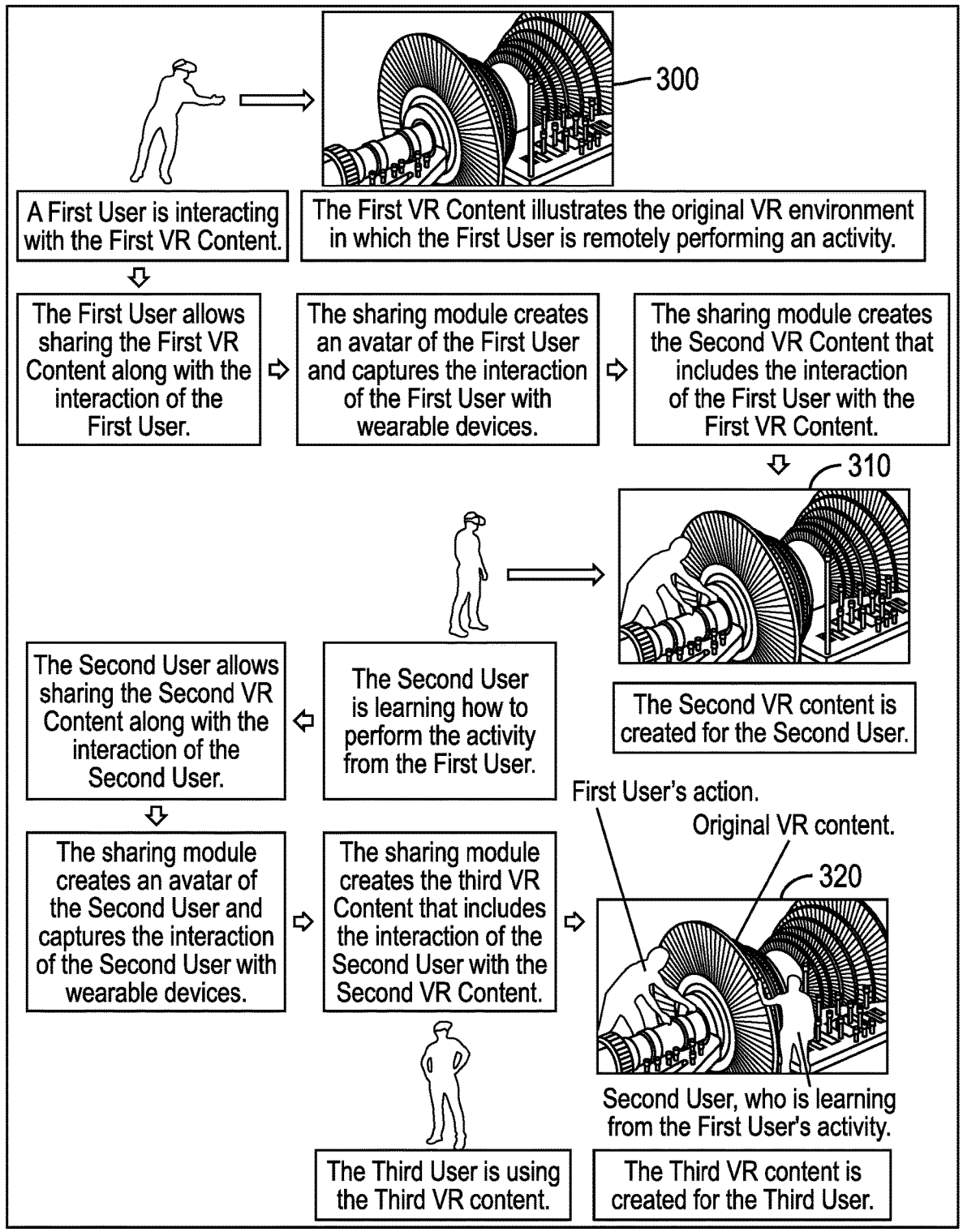
FIG. 3 illustrates sharing of VR content in accordance with certain embodiments.

As another example, User C at Node C is watching the VR content shared by User A at Node A and also performing an activity in the VR environment (e.g., also performing remote machine maintenance or another activity). For example, User C at node C may be learning how User A at Node A is performing the remote machine maintenance, and User C at Node C is taking notes and attempting remote machine maintenance. User D at Node D is viewing the shared VR content of User A at Node A and User C at Node C. User D at Node D sees the VR environment, sees the activity performed by User A at Node A (e.g., performing remote machine maintenance), and sees the activity performed by User C at Node C (e.g., taking notes). That is, User D at node D is able to visualize how User C at Node C is learning from User A at Node A, and User D at Node D is able to follow User A at Node A's remote machine maintenance. In this example, User D at Node D also performs an activity (e.g., performing a parallel proof-of-concept analysis). User F at node F is viewing the shared VR content of User A at Node A, User C at Node C, and User D at Node D. User F at Node F sees the VR environment, sees the activity performed by User A at Node A (e.g., performing remote machine maintenance), sees the activity performed by User C at Node C (e.g., taking notes), and sees the activity performed by User D at Node D (e.g., performing the parallel proof-of-concept analysis). That is, User F at node F is able to visualize how User D at Node D is learning from User C at Node C and how User C at Node C is learning from User A at Node A. In addition, User F at Node F is able to follow User A at Node A perform remote machine maintenance. In this example, since User A at Node A is not receiving VR content from descendant nodes, so User A at Node A does not visualize anything that users at descendant nodes are performing (e.g., User A at Node A does not visualize User C at Node C taking notes), FIG. 3 illustrates sharing of VR content in accordance with certain embodiments. In FIG. 3, while a first user wearing a first VR headset is interacting with the first VR content 300 (e.g., remotely operating a machine), first user shares the first VR content, along with the interaction of the first user, with a second user wearing a second VR headset (e.g., so that the second user may visualize and learn how the first user is remotely operating the machine). The sharing module at the first VR headset creates an avatar of the first user and captures the activity of the first user with one or more wearable devices that the first user wears and/or with one or more Internet of Things (IoT) devices. Then, the sharing module at the first VR headset creates second VR content 310 that adds the avatar of the first user and the first user's activity to the first VR content. An avatar may be described as a figure that represents the user and may look like the user.

While the second user is watching the second VR content 310, the second user is learning from the first user how to perform the activity and is also interacting with the second VR content 310. The second user shares the second VR content, along with the interaction of the first user and the interaction of the second user, with a third user wearing a third VR headset (e.g., so that the third user can visualize and learn how the first user is remotely operating the machine and learn how the second user is embracing ("adopting") the learning). The sharing module at the second VR headset creates an avatar of the second user and captures the activity of the second user with one or more wearable devices that the second user wears and/or with one or more IoT devices. Then, the sharing module at the second VR headset creates third VR content 320 that adds the avatar of the second user and the second user's activity to the second VR content. In this manner, the sharing module at the second VR headset incrementally updates the second VR content 310 to create the third VR content 320.

With embodiments, incremental update refers to the sharing module at one node creating new VR content by adding additional information to the VR content received from an ancestor, sending node. The additional information may be an avatar that is interacting with the VR environment.

Thus, embodiments enable multiple users to share VR content and learn from each other. In this example, the second user is learning from the first user, and the second user is embracing this learning. Continuing with this example, the third user is learning how the second user is embracing the learning. With embodiments, the users sharing the VR content may participate in the VR content via avatars.

In certain embodiments, the sharing module enables sharing a chain of VR content with additional information from the sharing party. In certain embodiments, the additional information may include an avatar of a user interacting with the VR environment, a direction of view of the avatar (e.g., a viewpoint), a formation of the avatar from the sending node, etc. The additional embodiment may include the additional information for one or more avatars. For each node in the chain, the sharing module at that sending node updates the previously shared VR content (from an ancestor node) with the additional information about a user interacting with the VR content at the sending node so that the new receiving node (which is a descendant of the sending node) gets the complete VR content. For the chain of VR content sharing from different sharing nodes, the VR content may be updated incrementally from each sending node to each receiving node, based on each node's relative position in the chain, which allows each node to display the updated VR content for a user at that node.

In certain embodiments, while receiving shared VR content from any VR sending node, each user at a receiving node may request to change a relative position within the chain, and, if the request is accepted, the sharing module at the receiving node dynamically adjusts (i.e., changes) the VR content at that receiving node. That is, the receiving node may elect to receive the VR content from a different sending node in the chain. For example, with reference to FIG. 2, User E at receiving Node E may move from the current position in the chain (with User B at Node B being the sending node for user E at Node E) to User F's position in the chain (with User D at Node D becoming the sending node for User E at Node E). This may be described as shared time as the receiving node is able to move from receiving the VR content from one node in the chain to receiving the VR content from another node in the chain.

In certain embodiments, while receiving shared VR content from any VR sending node, each user at a receiving node may request to change a relative position within the VR environment, and the sharing module receives the request and dynamically adjusts (i.e., changes) the VR content at that receiving node. This enables users at different receiving nodes to have different positions within the VR environment. The change in relative position may be described as changing a viewpoint (i.e., perspective) of a user. For example, if the VR environment shows a sporting event, each receiving node may show the sporting event from a different viewpoint (e.g., one viewpoint may be from the sports field, while another viewpoint may be from the stands surrounding the sports field).

In certain embodiments, the sharing module at the sending node identifies information about the user at the sending node and how the user is using the VR content from that user's perspective (e.g., learning to perform remote machine maintenance), and the sharing module at the sending node creates additional VR content with respect to the user at the sending node. The sharing module at each receiving node in the chain receives incremental updates of the VR content from the sharing module at the respective ancestor, sending node in the chain. That is, embodiments enable incremental updating of VR content from each node from the sending node's perspective.

In certain embodiments, while sharing any VR content, the sharing module at the sending node may decide whether the additional information is to be part of the newly shared VR content or whether original (i.e., "initial") shared VR content without the additional information us to be shared. Based on these determinations, the sharing module sends the VR content. That is, a user may choose settings to indicate to the sharing module which receiving node in the chain is to receive the new VR content with the additional information and which receiving node in the chain is to receive the new VR content without the additional information. Thus, any user at a receiving node in the chain may receive shared VR content based on the access set by the user at the sending node.

In certain embodiments, while sharing VR content, the sharing module at a sending node identifies how many receiving nodes for that sending node share the VR content, along with respective information about the users of those receiving nodes. Then, the sharing module at a sending node aggregates the shared information from the same node and creates new VR content for the next, descendent sharing node in the chain. That is, embodiments allow group node sharing. With reference to FIG. 2, User B at Node B and User C at Node C share VR content from User A at Node A, so a user at a new receiving node that requests sharing from User B at Node B and User C at Node C receives the aggregated actions of User B and User C on User A's shared VR content. That is, embodiments allow sharing among nodes from different chains, and the sharing module aggregates the incremental updates from each sending node. This depends on whether a sending node allows sharing and allows sharing original content versus original content with additional information.

In certain embodiments, while receiving VR content, the sharing module at the receiving node may select the appropriate sending node, and the sharing module at the receiving node enables the user to visualize the shared VR content from the selected sending node. That is, while sharing the VR content, a user may request sharing with any sending node in the chain. With reference to FIG. 2, User A at Node A, a sending node, may share the VR content with User F at Node F, a receiving node.

In certain embodiments, a user at a sending node may request to receive VR content from a receiving node. For example, with reference to FIG. 2, User A at Node A, a sending node, may ask to share VR content with User C at Node C, a receiving node, and, since User C is performing an activity, the Node C sends Node A updated VR content that includes the activity of User C, and Node A aggregates the VR content so that User A is able to see User C's activity in the VR content being shared.

Figure 4A:
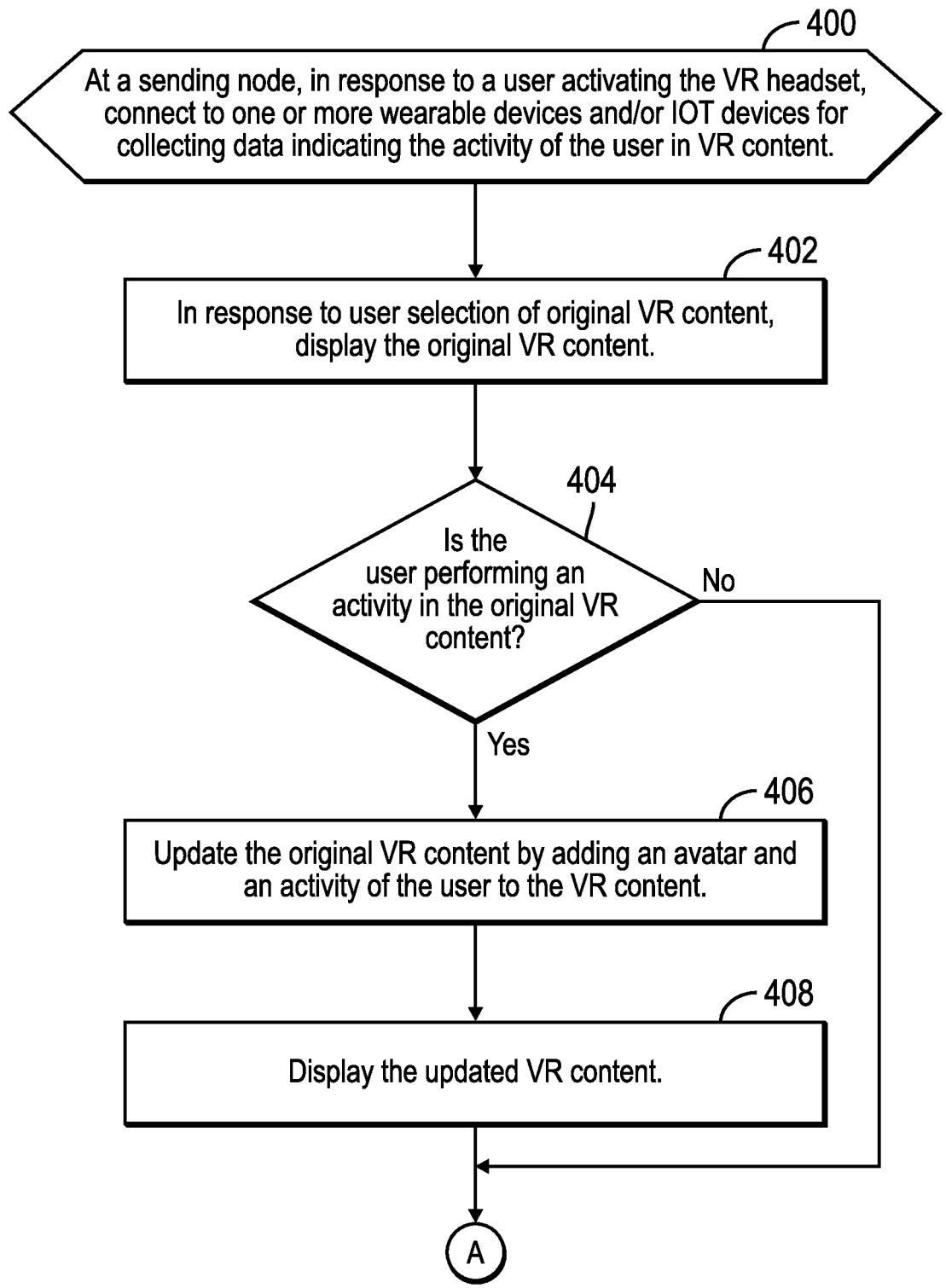
FIGS. 4A, 4B, 4C, and 4D illustrate, in a flowchart, operations at a sending node in accordance with certain embodiments.
Figure 4B:
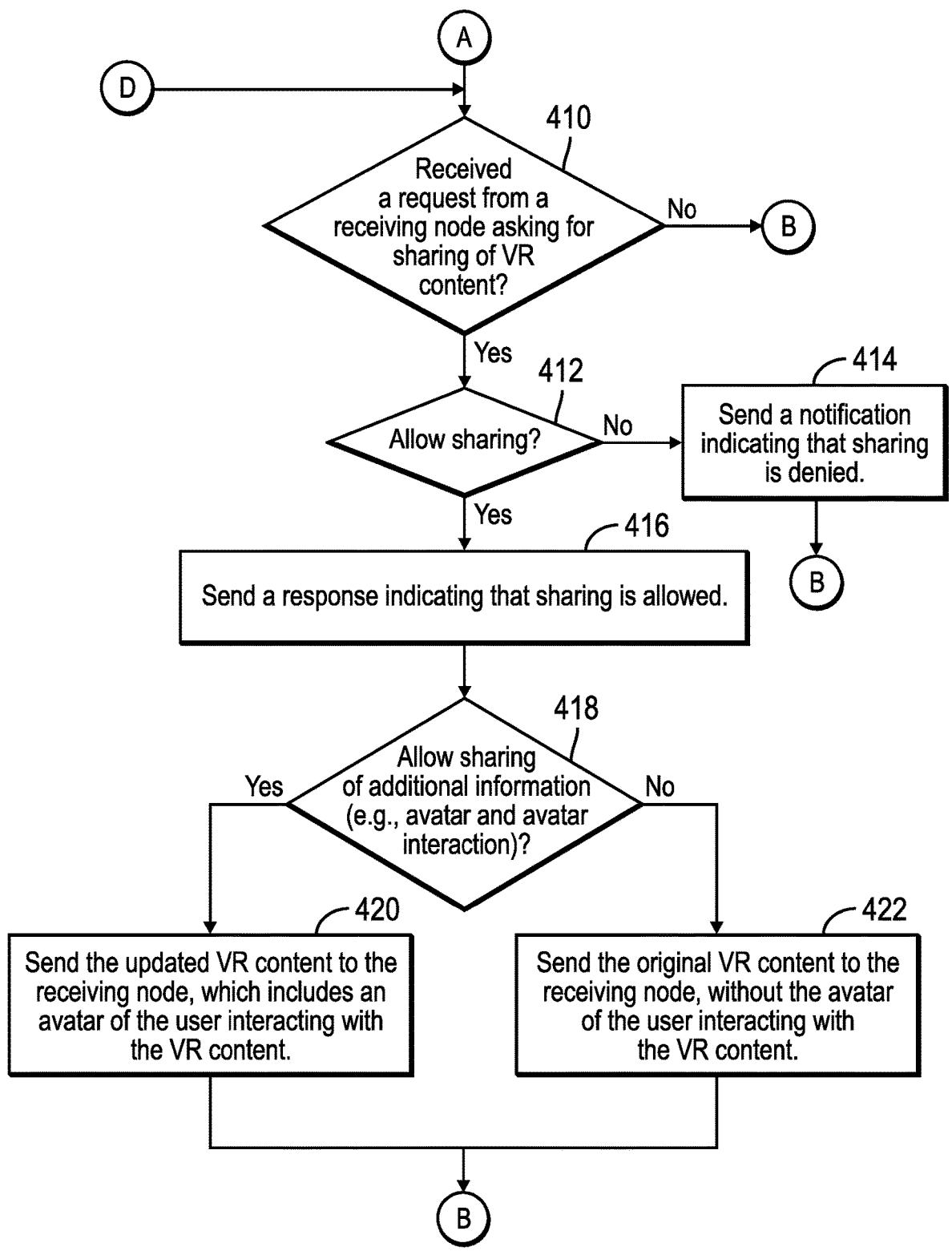

FIGS. 4A, 4B, 4C, and 4D illustrate, in a flowchart, operations at a sending node in accordance with certain embodiments. In response to a user activating the VR headset, control begins at block 600 with a sharing module at a sending node, connecting to one or more wearable devices and/or IOT devices for collecting data indicating the activity of the user in VR content. In block 402, in response to user selection of VR content, the sharing module displays original VR content. In block 404, the sharing module determines whether the user is performing an activity in the original VR content. If so, processing continues to block 406, otherwise, processing continues to block 410 (FIG. 4B). With embodiments, the sharing module determines whether the user is performing the activity based on receiving data from one or more wearable devices and/or one or more IoT devices.

In block 406, the sharing module updates the original VR content by adding an avatar and an activity of the user to the VR content (i.e., by adding additional information to the original VR content). In block 408, the sharing module displays the updated VR content. From block 408 (FIG. 4A), processing continues to block 410 (FIG. 4B).

In block 410, the sharing module determines whether a request has been received from a receiving node asking for sharing of the VR content. If so, processing continues to block 412, otherwise processing continues to block 426 (FIG. 4C).

In block 412, the sharing module determines whether sharing with this receiving node is allowed. If so, processing continues to block 416, otherwise, processing continues to block 414. With embodiments, the sharing module receives input from the user n whether sharing is allowed with this receiving node. In other embodiments, the sharing modules accessed stored information (e.g., a file or a database table). The stored information indicates which users or nodes are allowed to share VR content. For those users or nodes that are allowed to share the VR content, the stored information indicates whether those users or nodes are allowed to share VR content with additional information or without additional information.

Figure 4C:
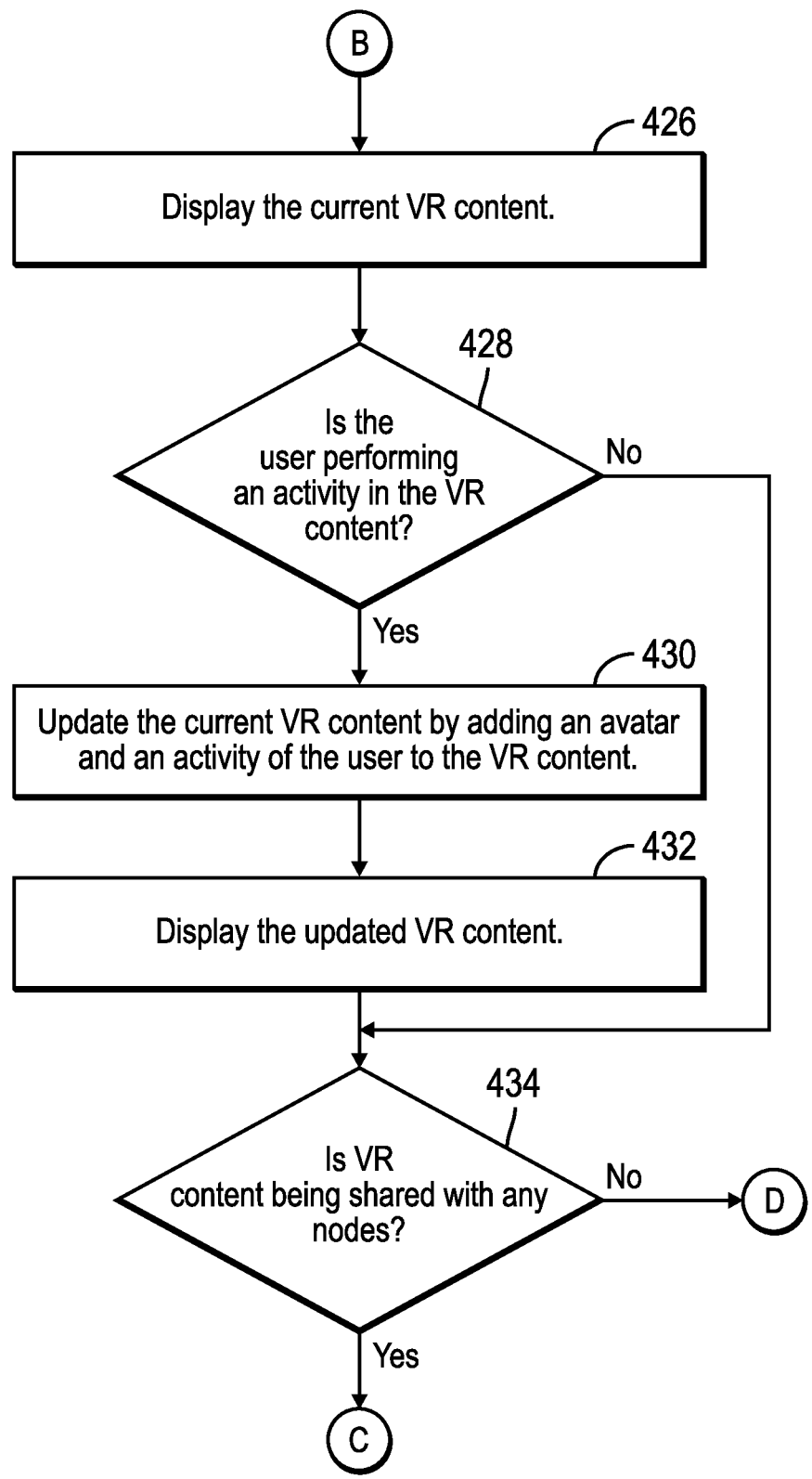
Figure 4D:
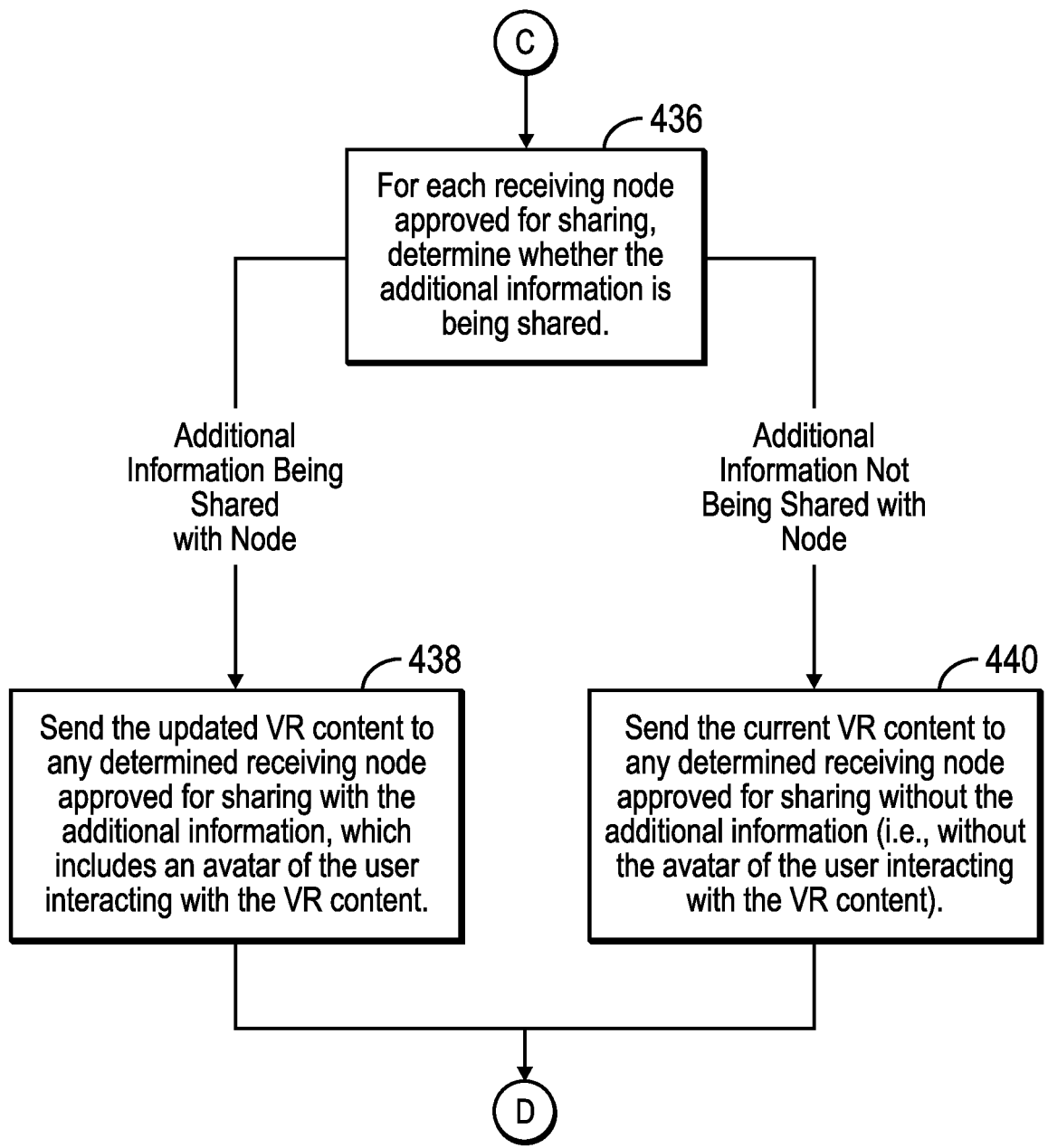

In block 414, the sharing module sends a notification indicating that sharing is denied and processing continues to block 426 (FIG. 4C).

In block 416, the sharing module sends a response indicating that sharing is allowed.

In block 418, the sharing module determines whether sharing of additional information is allowed. If so, processing continues to block 420, otherwise, processing continues to block 422. With embodiments, the additional information includes the avatar of the user interacting with the VR content. With other embodiments, the additional information may also include more information (e.g., a viewpoint of the user).

In block 422, the sharing module send the updated VR content to the receiving node, which includes the additional information of an avatar of the user interacting with the VR content. From block 422 (FIG. 4B), processing continues to block 426 (FIG. 4C).

In block 424, the sharing module sends the original VR content to the receiving node, without the avatar of the user interacting with the VR content. From block 422 (FIG. 4B), processing continues to block 426 (FIG. 4C).

In block 426, the sharing module displays the current VR content. With embodiments, the current VR content is current with reference to either the original VR content from block 402, the updated VR content from block 408 or the updated VR content from block 432.

In block 428, the sharing module determines whether the user is performing an activity in the VR content. If so, processing continues to block 430, otherwise, processing continues to block 434.

In block 430, the sharing module updates the current VR content by adding an avatar and an activity of the user to the current VR content.

In block 432, the sharing module displays the updated VR content.

In block 434, the sharing module determines whether the VR content is being shared (e.g., by or more receiving nodes). If so, processing continues to block 436 (FIG. 4D), otherwise, processing continues to block 426.

In block 436, for each receiving node approved for sharing, the sharing module determines whether the additional information is being shared and may create a list of receiving nodes approved for sharing with the additional information and a list of receiving nodes approved for sharing without the additional information. For any node for which the additional information is being shared, processing continues to block 438. For any node for which the additional information is not being shared, processing continues to block 440.

In block 438, the sharing module sends the updated VR content to any determined receiving node (i.e., zero or more) approved for sharing with the additional information, which includes an avatar of the user interacting with the VR content. From block 438 (FIG. 4D), processing continues to block 410 (FIG. 4B).

In block 440, the sharing module sends the current VR content to any determined receiving node (i.e., zero or more) approved for sharing without the additional information (i.e., without the avatar of the user interacting with the VR content). From block 440 (FIG. 4D), processing continues to block 410 (FIG. 4B).

Figure 5A:
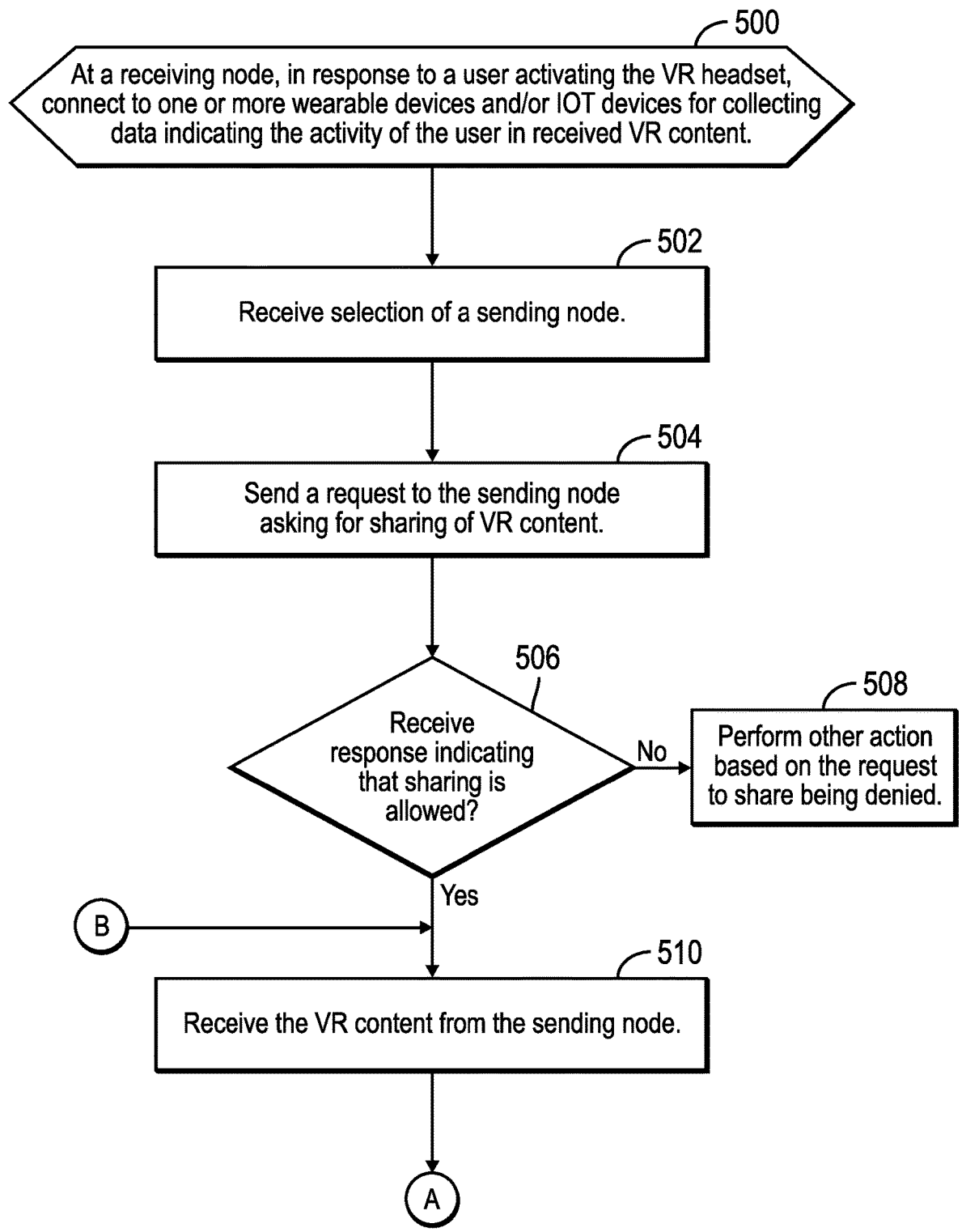
FIGS. 5A and 5B illustrate, in a flowchart, operations at a receiving node in accordance with certain embodiments.
Figure 5B:
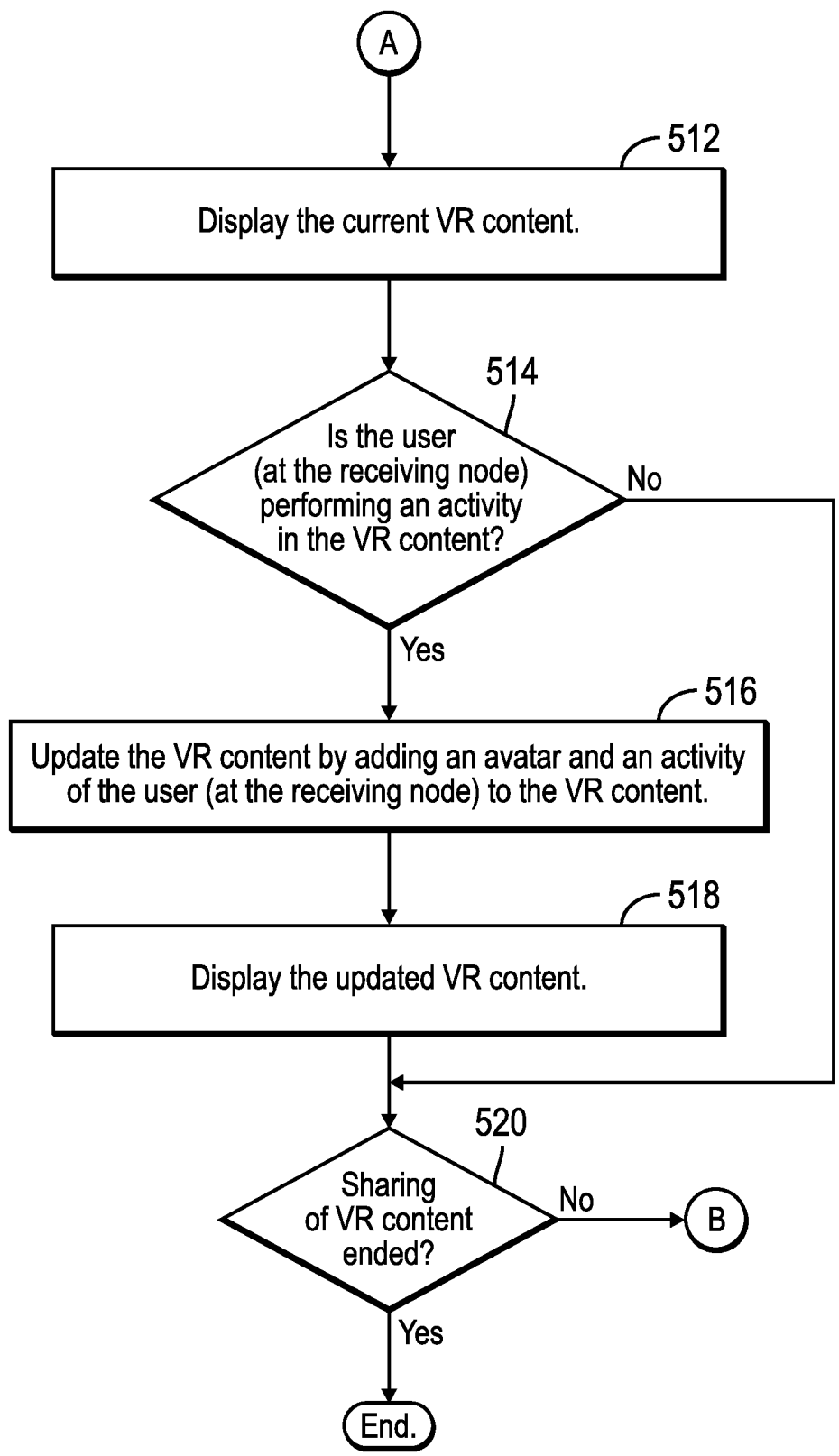

FIGS. 5A and 5B illustrate, in a flowchart, operations at a receiving node in accordance with certain embodiments. In response to a user activating the VR headset, control begins at block 500, with the sharing module, at a receiving node, connecting to one or more wearable devices and/or IOT devices for collecting data indicating the activity of the user in the received VR content. The VR content is received from a sharing module of a sending node.

In block 502, the sharing module receives selection of a sending node. In block 504, the sharing module sends a request to the sending node asking for sharing of VR content. In block 506, the sharing module determines whether a response was received indicating that sharing is allowed. If so, processing continues to block 510, otherwise, processing continues to block 508.

In block 508, the sharing module performs other action based on the request to share being denied. For example, the sharing module may request sharing with another node in the same or different chain of nodes.

In block 510, the sharing module receives the VR content from the sending node. From block 510 (FIG. 5A), processing continues to block 512 (FIG. 5B).

In block 512, the sharing module displays the VR content. With embodiments, the current VR content is current with reference to either the VR content from block 510 or the updated VR content from block 518.

In block 514, the sharing module determines whether the user (at the receiving node) is performing an activity in the original VR content. If so, processing continues to block 516, otherwise, processing continues to block 520. With embodiments, the sharing module determines whether the user is performing the activity based on receiving data from one or more wearable devices and/or one or more IoT devices.

In block 516, the sharing module updates the VR content by adding an avatar and an activity of the user (at the receiving node) to the VR content. In block 518, the sharing module displays the updated VR content.

In block 520, the sharing module determines whether sharing of VR content ended. This may be based on either this receiving node ending the sharing (e.g., to share with another node to shut down the VR headset) or on a sending node ending the sharing (e.g., the user at the sending node is shutting down the VR headset). If so, processing ends, otherwise, processing continues to block 510.

Figure 6:
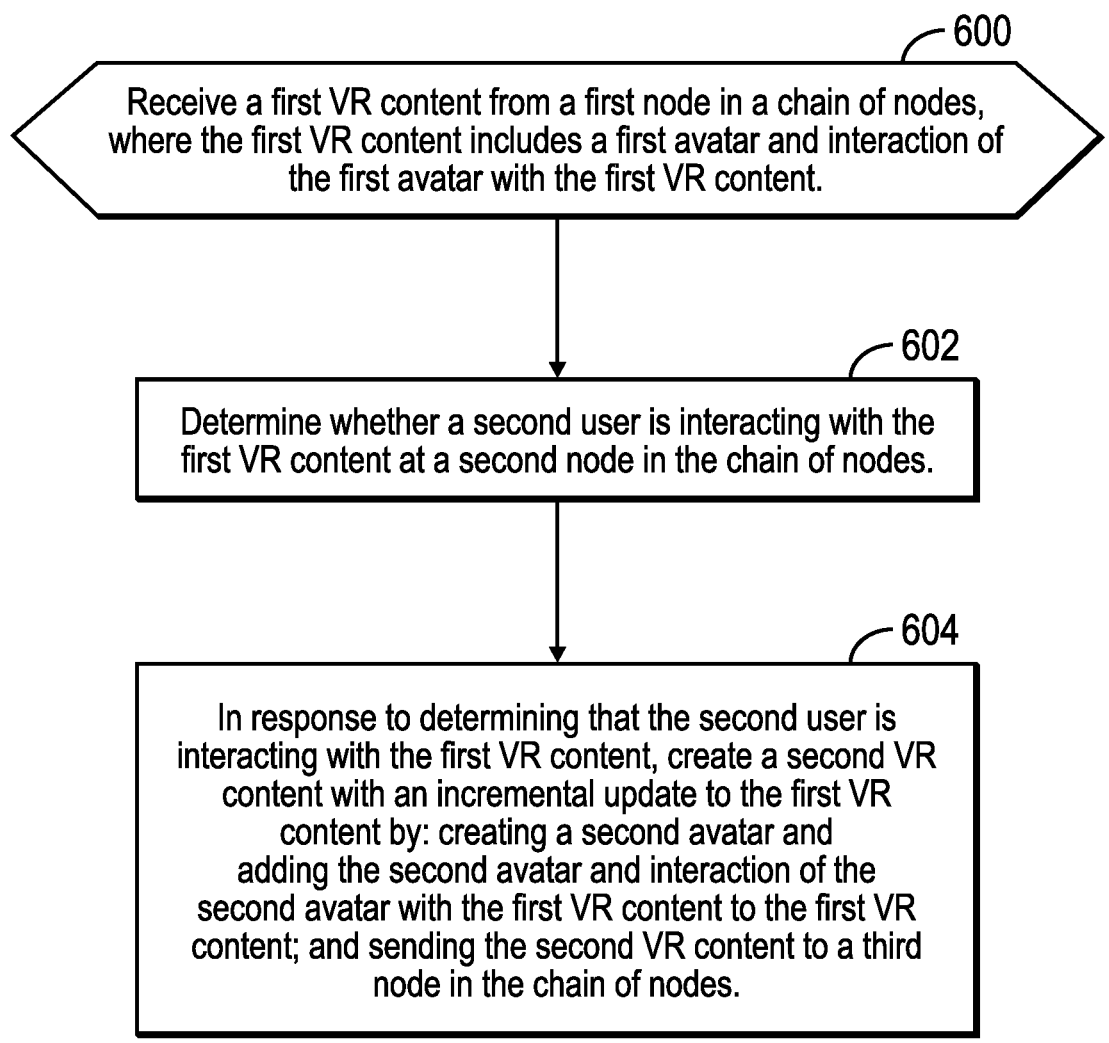
FIG. 6 illustrates, in a flowchart, operations for a chain of virtual reality content sharing with activity information.

FIG. 6 illustrates, in a flowchart, operations for a chain of virtual reality content sharing with activity information. Control begins at block 600 with the sharing module receiving a first VR content from a first node in a chain of nodes, where the first VR content includes a first avatar and interaction of the first avatar with the first VR content. In block 602, the sharing module determines whether a second user is interacting with the first VR content at a second node in the chain of nodes. In block 604, in response to determining that the second user is interacting with the first VR content, the sharing module creates second VR content with an incremental update to the first VR content by: creating a second avatar and adding the second avatar and interaction of the second avatar with the first VR content to the first VR content. In addition, the sharing module sends the second VR content to a third node in the chain of nodes.

In certain embodiments, while interacting with the VR content, the sharing module connects to wearable devices of the user and/or to one or more IoT devices to identify the interaction of the avatar representing the user in the VR environment. For example, the wearable devices may include a smartwatch, electronic clothes with sensor, shoes with sensors, VR glass, etc. The IoT devices may include a movement sensor attached to shoes or clothes, etc. The sharing module identifies the VR content being displayed, and, based on the wearable devices and/or the IoT devices, determines what activity is being performed by the user.

In certain embodiments, the sharing module creates an avatar of a first user and creates VR content that shows the avatar of the first user interacting with the VR content. If the first user allows sharing the VR content, then the sharing module may share the original VR content (that does not include the avatar and the interaction of the first user) or may share updated VR content that includes the avatar and the interaction that indicates the actions that the first user is performing with the VR content.

That is, if the first user shares the VR content without the interaction of the first user, then the sharing module sends the original VR content to the receiving node. On the other hand, if the first user is sharing the VR content along with the interaction of the first user on the VR content, the sharing module sends updated VR content to the receiving node.

In certain embodiments, the sharing module aggregates the original VR content and the first user's interaction on the VR content to create updated (new) VR content.

In certain embodiments, the sharing module at the node of the first user tracks real time actions of the first user on the original VR content and streams the updated VR content.

In certain embodiments, the sharing module enables the second user to view how the first user is interacting with the original VR content. Then, the original VR content for the second user is the VR content shared by the first user (either with or without the user's interactions).

In certain embodiments, once the sharing module at the node of the second user receives the VR content from the sharing module at the node of the first user, then the sharing module enables the second user to view how the first user is interacting with the VR content. In addition, the sharing module enables the second user to change a relative position in the chain by ending the sharing with the node of the first user and starting the sharing with another node of another user in the chain.

In certain embodiments, if the sharing module at the node of the second user does not change the relative sharing node, then the sharing module shows the second user views the shared VR content from the first user.

In certain embodiments, the sharing module enables the second user to change a relative position to first user's position or to a previous position of the second user, and this reflects a changing viewpoint of the second user in the VR content.

In certain embodiments, the sharing module updates the VR content from an ancestor node with the activity of the current user.

In certain embodiments, the sharing module may use a Generative Adversarial Network (GAN) or any other technology to create the VR content and associate the interaction of the avatar representing the user with the VR content.

In certain embodiments, the sharing module creates new VR content at any sending node, and the sharing module at the receiving node allows the user at that receiving node to view the updated VR content.

In certain embodiments, the sharing module enables the receiving node to change a relative position in the chain and to start sharing VR content from a new sending node. Then, the sharing module allows the user to interact with the VR content from the new sending node.

In certain embodiments, any user at any node may collaborate with any other user at any other node or at multiple other nodes, and the sharing module creates aggregated shared VR content from the VR content received from multiple sending nodes.

In certain embodiments, while joining in any VR content, the user notifies the sharing module of which sharing node the user wants to join, otherwise, the sharing module provides original VR content for that user.

In certain embodiments, while sharing any VR content, multiple users at multiple nodes may share the VR content, and the sharing module at each of the multiple nodes aggregates the VR content.

In certain embodiments, the sharing module at different nodes enables the users at those nodes to select the sharing node and view how different users at different sharing nodes are interacting with the VR content.

Thus, embodiments provide incremental update of VR content from each sharing node, with the activities of a user at in each ancestor node being updated and sent to the next descendant node in the chain.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
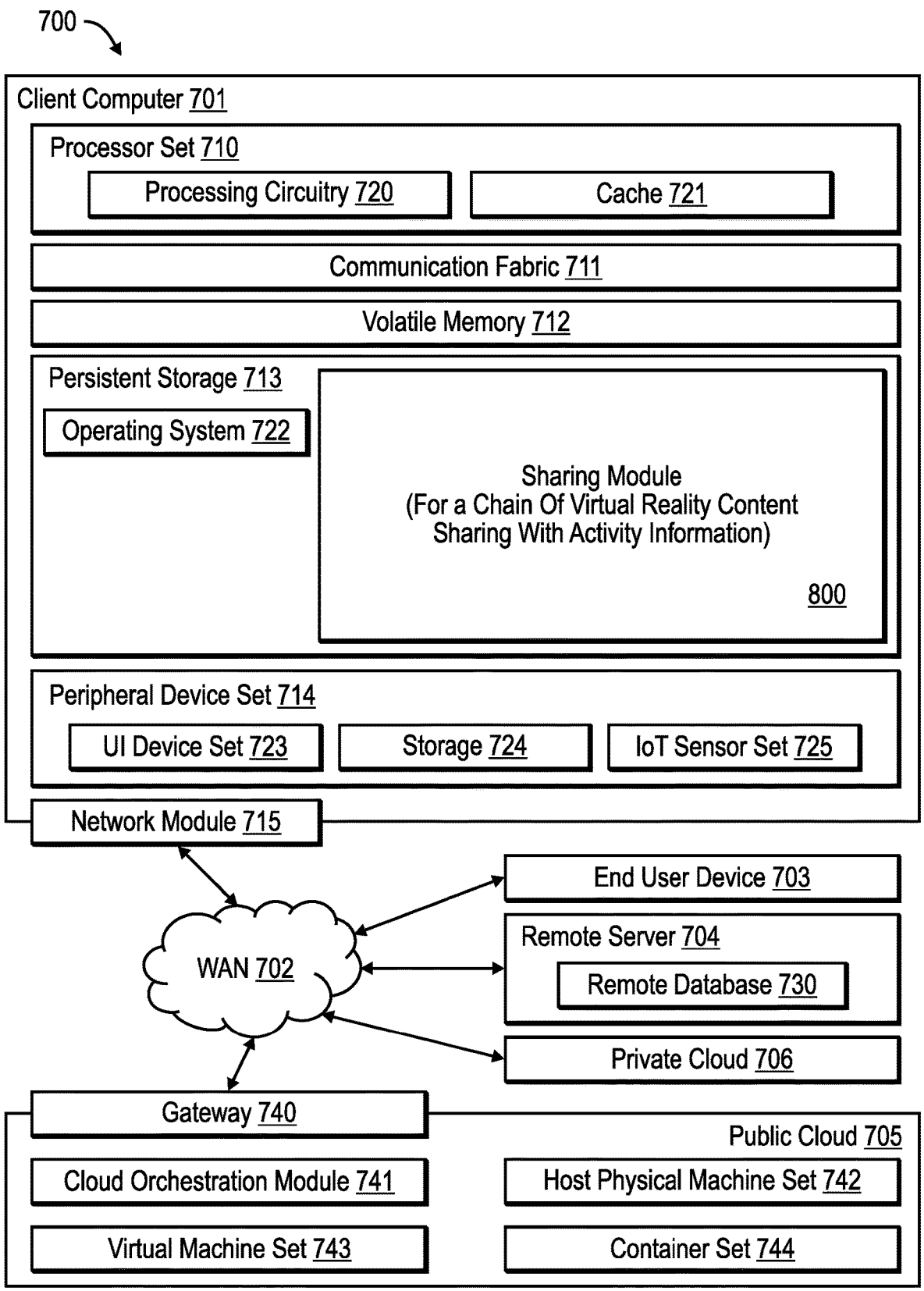
FIG. 7 illustrates a computing environment in accordance with certain embodiments.

FIG. 7 illustrates a computing environment 700 in accordance with certain embodiments. In certain embodiments, each node 110, 120, 130 is a computing environment 700. Computing environment 700 contains an example of an environment for the execution of at least some of the computer code involved in performing the inventive methods, such as sharing module 800 (for a chain of virtual reality content sharing with activity information). In certain embodiments, sharing modules 112, 122, 132 are examples of sharing module 800 of FIG. 7. In addition to block 800, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 800, as identified above), peripheral device set 714 (including user interface (UI) device set 723, storage 724, and IoT sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 800 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 800 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

ADDITIONAL EMBODIMENT DETAILS

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   receiving a first Virtual Reality (VR) content from a first node in a chain of nodes, wherein the first VR content includes a first avatar and interaction of the first avatar with the first VR content;
   determining whether a second user is interacting with the first VR content at a second node in the chain of nodes;
   in response to determining that the second user is interacting with the first VR content,
      creating a second VR content with an incremental update to the first VR content by:

creating a second avatar; and
adding the second avatar and interaction of the second avatar with the first VR content to the first VR content; and
sending the second VR content to a third node in the chain of nodes.

2. The computer-implemented method of claim 1, wherein the operations further comprise:
in response to determining that the second user is not interacting with the first VR content, sending the first VR content to the third node.

3. The computer-implemented method of claim 1, wherein the operations further comprise:
receiving a request to share the second VR content with a fourth node in the chain of nodes;
sending a response that sharing is allowed;
determining whether to share the second avatar and interaction of the second avatar with the first VR content;
in response to determining that the second avatar and interaction of the second avatar with the first VR content is to be shared, sending the second VR content to the fourth node; and
in response to determining that the second avatar and interaction of the second avatar with the first VR content is not to be shared, sending the first VR content to the fourth node.

4. The computer-implemented method of claim 1, wherein the second node changes a position in the chain of nodes by requesting to receive new VR content from a different node in the chain of nodes.

5. The computer-implemented method of claim 1, wherein the second node receives VR content from multiple nodes and aggregates the VR content for the third node.

6. The computer-implemented method of claim 1, wherein the operations further comprise:
sending the second VR content to multiple nodes.

7. The computer-implemented method of claim 1, wherein a viewpoint of the second user in the second VR content changes.

8. The computer-implemented method of claim 1, wherein the determination of whether the second user is interacting with the first VR content at the second node is based on capturing activity of the second user with any combination of: one or more wearable devices that the second user wears and one or more Internet of Things (IoT) devices.

9. A computer program product, the computer program product comprising a computer readable storage medium having program code embodied therewith, the program code executable by at least one processor to perform operations for:
receiving a first Virtual Reality (VR) content from a first node in a chain of nodes, wherein the first VR content includes a first avatar and interaction of the first avatar with the first VR content;
determining whether a second user is interacting with the first VR content at a second node in the chain of nodes;
in response to determining that the second user is interacting with the first VR content,
creating a second VR content with an incremental update to the first VR content by:
creating a second avatar; and
adding the second avatar and interaction of the second avatar with the first VR content to the first VR content; and
sending the second VR content to a third node in the chain of nodes.

10. The computer program product of claim 9, wherein the program code is executable by the at least one processor to perform operations for:
in response to determining that the second user is not interacting with the first VR content, sending the first VR content to the third node.

11. The computer program product of claim 9, wherein the program code is executable by the at least one processor to perform operations for:
receiving a request to share the second VR content with a fourth node in the chain of nodes;
sending a response that sharing is allowed;
determining whether to share the second avatar and interaction of the second avatar with the first VR content;
in response to determining that the second avatar and interaction of the second avatar with the first VR content is to be shared, sending the second VR content to the fourth node; and
in response to determining that the second avatar and interaction of the second avatar with the first VR content is not to be shared, sending the first VR content to the fourth node.

12. The computer program product of claim 9, wherein the second node changes a position in the chain of nodes by requesting to receive new VR content from a different node in the chain of nodes.

13. The computer program product of claim 9, wherein the second node receives VR content from multiple nodes and aggregates the VR content for the third node.

14. The computer program product of claim 9, wherein the program code is executable by the at least one processor to perform operations for:
sending the second VR content to multiple nodes.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
receiving a first Virtual Reality (VR) content from a first node in a chain of nodes, wherein the first VR content includes a first avatar and interaction of the first avatar with the first VR content;
determining whether a second user is interacting with the first VR content at a second node in the chain of nodes;
in response to determining that the second user is interacting with the first VR content,
creating a second VR content with an incremental update to the first VR content by:
creating a second avatar; and
adding the second avatar and interaction of the second avatar with the first VR content to the first VR content; and
sending the second VR content to a third node in the chain of nodes.

16. The computer system of claim 15, wherein the operations further comprise:
in response to determining that the second user is not interacting with the first VR content, sending the first VR content to the third node.

17. The computer system of claim 15, wherein the operations further comprise:
- receiving a request to share the second VR content with a fourth node in the chain of nodes;
- sending a response that sharing is allowed;
- determining whether to share the second avatar and interaction of the second avatar with the first VR content;
- in response to determining that the second avatar and interaction of the second avatar with the first VR content is to be shared, sending the second VR content to the fourth node; and
- in response to determining that the second avatar and interaction of the second avatar with the first VR content is not to be shared, sending the first VR content to the fourth node.

18. The computer system of claim 15, wherein the second node changes a position in the chain of nodes by requesting to receive new VR content from a different node in the chain of nodes.

19. The computer system of claim 15, wherein the second node receives VR content from multiple nodes and aggregates the VR content for the third node.

20. The computer system of claim 15, wherein the operations further comprise:
- sending the second VR content to multiple nodes.

* * * * *